United States Patent
Otsuki

(10) Patent No.: US 10,559,066 B2
(45) Date of Patent: Feb. 11, 2020

(54) IMAGE PROCESSING DEVICE AND IMAGE PROCESSING METHOD

(71) Applicant: SONY SEMICONDUCTOR SOLUTIONS CORPORATION, Kanagawa (JP)

(72) Inventor: Seichi Otsuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 59 days.

(21) Appl. No.: 15/769,887

(22) PCT Filed: Oct. 31, 2016

(86) PCT No.: PCT/JP2016/082216
§ 371 (c)(1),
(2) Date: Apr. 20, 2018

(87) PCT Pub. No.: WO2017/082092
PCT Pub. Date: May 18, 2017

(65) Prior Publication Data
US 2018/0308220 A1 Oct. 25, 2018

(30) Foreign Application Priority Data
Nov. 13, 2015 (JP) .................. 2015-222899

(51) Int. Cl.
*G06T 5/00* (2006.01)
*G06T 5/50* (2006.01)

(52) U.S. Cl.
CPC .............. *G06T 5/002* (2013.01); *G06T 5/50* (2013.01); *G06T 2207/20224* (2013.01)

(58) Field of Classification Search
CPC .. G06T 5/002; G06T 5/20; G06T 2207/20224
See application file for complete search history.

(56) References Cited

U.S. PATENT DOCUMENTS

| | | | | |
|---|---|---|---|---|
| 2010/0182452 A1* | 7/2010 | Utsugi | ................ | H04N 5/217 348/231.2 |
| 2010/0182462 A1* | 7/2010 | Utsugi | ................ | H04N 5/357 348/241 |

(Continued)

FOREIGN PATENT DOCUMENTS

| CN | 102737365 A | 10/2012 |
|---|---|---|
| CN | 103873836 A | 6/2014 |

(Continued)

OTHER PUBLICATIONS

International Search Report and Written Opinion of PCT Application No. PCT/JP2016/082216, dated Nov. 22, 2016, 07 pages of English Translation and 06 pages of ISRWO.

(Continued)

*Primary Examiner* — Ping Y Hsieh
(74) *Attorney, Agent, or Firm* — Chip Law Group

(57) ABSTRACT

The present technology relates to an image processing device and an image processing method capable of reducing a used amount of a memory while suppressing deterioration in a noise reduction effect of an image. An image processing device is provided with a reduced image generation unit which reduces an original image in a stepwise manner to generate one or more n reduced images, a noise reduction unit which reduces a noise component in a predetermined frequency band of the original image, a noise extraction unit which performs processing of extracting a noise component in a predetermined frequency band from each of the reduced images in parallel, a noise synthesis unit which synthesizes noise components extracted from the respective reduced images, and a subtraction unit which subtracts a synthesized noise component from the original image after noise reduction. The present technology is applicable to, for example, an image processing device which reduces image noise.

6 Claims, 13 Drawing Sheets

(56) References Cited

U.S. PATENT DOCUMENTS

| 2010/0194934 | A1* | 8/2010 | Fukutomi | G06K 9/38 |
| | | | | 348/242 |
| 2012/0243801 | A1* | 9/2012 | Utsugi | H04N 5/2176 |
| | | | | 382/275 |
| 2014/0168473 | A1 | 6/2014 | Hirai | |

FOREIGN PATENT DOCUMENTS

| JP | 2010-166513 A | 7/2010 |
| JP | 2010-183182 A | 8/2010 |
| JP | 2010-187364 A | 8/2010 |
| JP | 2012-199774 A | 10/2012 |
| JP | 2014-119997 A | 6/2014 |

OTHER PUBLICATIONS

International Preliminary Report on Patentability of PCT Application No. PCT/JP2016/082216, dated May 24, 2018, 07 pages of English Translation and 04 pages of IPRP.

* cited by examiner

IMAGE PROCESSING DEVICE AND IMAGE PROCESSING METHOD

CROSS REFERENCE TO RELATED APPLICATIONS

This application is a U.S. National Phase of International Patent Application No. PCT/JP2016/082216 filed on Oct. 31, 2016, which claims priority benefit of Japanese Patent Application No. JP 2015-222899 filed in the Japan Patent Office on Nov. 13, 2015. Each of the above-referenced applications is hereby incorporated herein by reference in its entirety.

TECHNICAL FIELD

The present technology relates to an image processing device and an image processing method, and especially relates to an image processing device and an image processing method suitable for use in a case of reducing noise of an image.

BACKGROUND ART

Generally, human eyes have higher visibility for low-frequency components than high-frequency components of an image. Therefore, in a case where noise of an image is reduced by using two-dimensional noise reduction (NR) with a small number of taps, low-frequency noise remains without being removed, and the noise is noticeable in some cases. On the other hand, if the number of taps of the NR is increased in order to reduce the low-frequency noise, a circuit scale and an arithmetic amount increase.

Therefore, it is conventionally suggested to reduce the image in a stepwise manner to reduce high-frequency noise of the reduced image at each step (refer to, for example, Patent Document 1). Specifically, the high-frequency noise of the reduced image approximates the low-frequency noise of the image before reduction. Therefore, by reducing the high-frequency noise from the reduced image, it is possible to obtain an effect substantially equivalent to that in a case of reducing the low-frequency noise of the original image. Also, since the high-frequency noise may be reduced by the NR with a small number of taps, it is possible to suppress an increase in circuit scale and arithmetic amount.

CITATION LIST

Patent Document

Patent Document 1: Japanese Patent Application Laid-Open No. 2010-166513

SUMMARY OF THE INVENTION

Problems to be Solved by the Invention

However, in the invention disclosed in Patent Document 1, since the processing of the NR is sequentially performed, it is necessary that each NR stands by for the end of the processing of a precedent NR, so that a used amount of a memory increases.

The present technology is achieved in view of such a situation, and an object thereof is to reduce the used amount of the memory while suppressing deterioration in noise reduction effect of an image.

Solutions to Problems

An image processing device according to one aspect of the present technology is provided with a reduced image generation unit which reduces an original image in a stepwise manner to generate one or more n reduced images, a noise reduction unit which reduces a noise component in a predetermined frequency band of the original image, a noise extraction unit which performs processing of extracting a noise component in a predetermined frequency band from each of the reduced images in parallel, a noise synthesis unit which synthesizes noise components extracted from the respective reduced images, and a subtraction unit which subtracts a synthesized noise component from the original image after noise reduction.

It is possible to make frequency bands of the noise components extracted from the respective reduced images not overlapped with a frequency band in which the noise component is reduced by the noise reduction unit and a frequency band of the noise component extracted from another reduced image.

It is possible to make the noise reduction unit to reduce the noise component of the original image by using a filter the same as a filter used for reducing the original image and make the noise extraction unit to extract the noise component of each of the reduced images by using a filter the same as a filter used for reducing each of the reduced images.

It is possible that the noise extraction unit is provided with n extraction units which individually extract the noise components of the respective reduced images, and it is possible to make the noise reduction unit and the n extraction units to independently perform processing in parallel.

It is possible to make the noise synthesis unit to synthesize the noise components by adding the noise components in order from the noise component of the smallest reduced image while up-sampling at an enlargement factor opposite to a reduction factor when reducing the corresponding reduced image in a case of $n \geq 2$.

An image processing method according to one aspect of the present technology includes a reduced image generating step of reducing an original image in a stepwise manner to generate one or more n reduced images, a noise reducing step of reducing a noise component in a predetermined frequency band of the original image, a noise extracting step of performing processing of extracting a noise component in a predetermined frequency band from each of the reduced images in parallel, a noise synthesizing step of synthesizing noise components extracted from the respective reduced images, and a subtracting step of subtracting a synthesized noise component from the original image after noise reduction.

In one aspect of the present technology, an original image is reduced in a stepwise manner, one or more n reduced images are generated, a noise component in a predetermined frequency band of the original image is reduced, processing of extracting a noise component in a predetermined frequency band from each of the reduced images is performed in parallel, noise components extracted from the respective reduced images are synthesized, and a synthesized noise component is subtracted from the original image after noise reduction.

Effects of the Invention

According to one aspect of the present technology, it is possible to reduce the used amount of the memory while suppressing the deterioration in noise reduction effect of an image.

Meanwhile, the effect is not necessarily limited to the effect herein described and may be any of the effects described in the present disclosure.

MODE FOR CARRYING OUT THE INVENTION

A mode for carrying out the present technology (hereinafter, referred to as an embodiment) is hereinafter described. Meanwhile, the description is given in the following order.
1. Embodiment
2. Comparison with Other Noise Reducing Method
3. Variation 1. Embodiment {Configuration Example of Information Processing Device 100}

Figure 1:
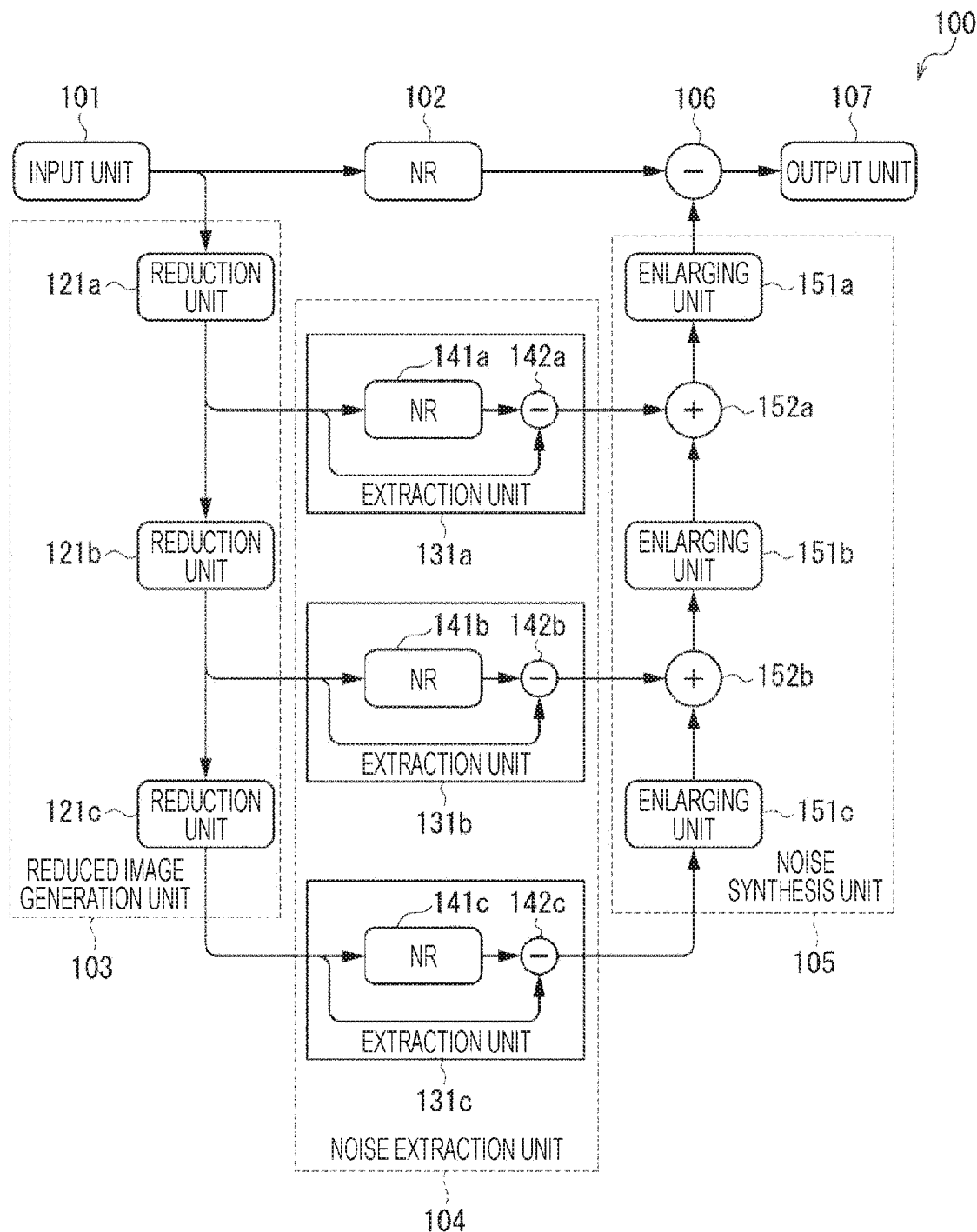
FIG. 1 is a block diagram illustrating an embodiment of an image processing device to which the present technology is applied.

FIG. 1 illustrates an embodiment of an image processing device 100 to which the present technology is applied.

The image processing device 100 is a device which outputs an image after reducing noise of an original image which is an externally input image. The image processing device 100 is provided with an input unit 101, a noise reduction (NR) 102, a reduced image generation unit 103, a noise extraction unit 104, a noise synthesis unit 105, a subtraction unit 106, and an output unit 107. The reduced image generation unit 103 is provided with reduction units 121a to 121c. The noise extraction unit 104 is provided with extraction units 131a to 131c. The noise synthesis unit 105 is provided with enlarging units 151a to 151c and addition units 152a and 152c.

The input unit 101 supplies the externally input original image to the NR 102 and the reduction unit 121a of the reduced image generation unit 103.

The NR 102 reduces a noise component in a predetermined frequency band of the original image (hereinafter referred to as a first noise component) and supplies the original image after the noise reduction to the subtraction unit 106.

The reduced image generation unit 103 reduces the original image in a stepwise manner and generates a plurality of reduced images.

Specifically, the reduction unit 121a reduces the original image at a predetermined magnification and supplies a reduced image (hereinafter referred to as a first reduced image) to the reduction unit 121b and the extraction unit 131a.

The reduction unit 121b reduces the first reduced image at a predetermined magnification and supplies a reduced image (hereinafter referred to as a second reduced image) to the reduction unit 121c and the extraction unit 131b.

The reduction unit 121c reduces the second reduced image at a predetermined magnification and supplies a reduced image (hereinafter referred to as a third reduced image) to the extraction unit 131c.

The noise extraction unit 104 extracts a noise component in a predetermined frequency band of each of the first to third reduced images.

Specifically, the extraction unit 131a is provided with a noise reduction (NR) 141a and a subtraction unit 142a. The NR 141a reduces a noise component in a predetermined frequency band of the first reduced image and supplies the first reduced image after the noise reduction to the subtraction unit 142a. The subtraction unit 142a obtains a difference between the first reduced image before the noise reduction and the first reduced image after the noise reduction, thereby extracting the noise component in a predetermined frequency band of the first reduced image (hereinafter, referred to as a second noise component). The subtraction unit 142a supplies the extracted second noise component to the addition unit 152a.

The extraction unit 131b is provided with a noise reduction (NR) 141b and a subtraction unit 142b. The NR 141b reduces a noise component in a predetermined frequency band of the second reduced image and supplies the second reduced image after the noise reduction to the subtraction unit 142b. The subtraction unit 142b obtains a difference between the second reduced image before the noise reduction and the second reduced image after the noise reduction, thereby extracting the noise component in a predetermined frequency band of the second reduced image (hereinafter, referred to as a third noise component). The subtraction unit 142b supplies the extracted third noise component to the addition unit 152b.

The extraction unit 151c is provided with a noise reduction (NR) 141c and a subtraction unit 142c. The NR 141c reduces a noise component in a predetermined frequency band of the third reduced image and supplies the third reduced image after the noise reduction to the subtraction unit 142c. The subtraction unit 142c obtains a difference between the third reduced image before the noise reduction and the third reduced image after the noise reduction, thereby extracting the noise component in a predetermined frequency band of the third reduced image (hereinafter, referred to as a fourth noise component). The subtraction unit 142c supplies the extracted fourth noise component to the enlarging unit 151c.

The noise synthesis unit 105 synthesizes the second to fourth noise components extracted from the first to third reduced images, respectively.

Specifically, the enlarging unit 151c enlarges the fourth noise component by up-sampling the same at a magnification opposite to that of the reduction unit 121c forming a pair with the enlarging unit 151c and supplies the enlarged fourth noise component to the addition unit 152b.

The addition unit 152b adds the third noise component to the enlarged fourth noise component and supplies a noise component after addition (hereinafter referred to as a second synthesized noise component) to the enlarging unit 151b.

The enlarging unit 151b enlarges the second synthesized noise component by up-sampling the same at a magnification opposite to that of the reduction unit 121b forming a pair with the enlarging unit 151b and supplies the enlarged second synthesized noise component to the addition unit 152a.

The addition unit 152a adds the second noise component to the second synthesized noise component and supplies a noise component after addition (hereinafter referred to as a first synthesized noise component) to the enlarging unit 151a.

The enlarging unit 151a enlarges the first synthesized noise component by up-sampling the same at a magnification opposite to that of the reduction unit 121a forming a pair with the enlarging unit 151a and supplies the enlarged first synthesized noise component to the subtraction unit 106.

The subtraction unit 106 subtracts the first synthesized noise component from the original image after the noise reduction and supplies the obtained image to the output unit 107.

The output unit 107 outputs the image supplied from the subtraction unit 106 as an output image.

{Noise Reduction Processing}

Figure 2:
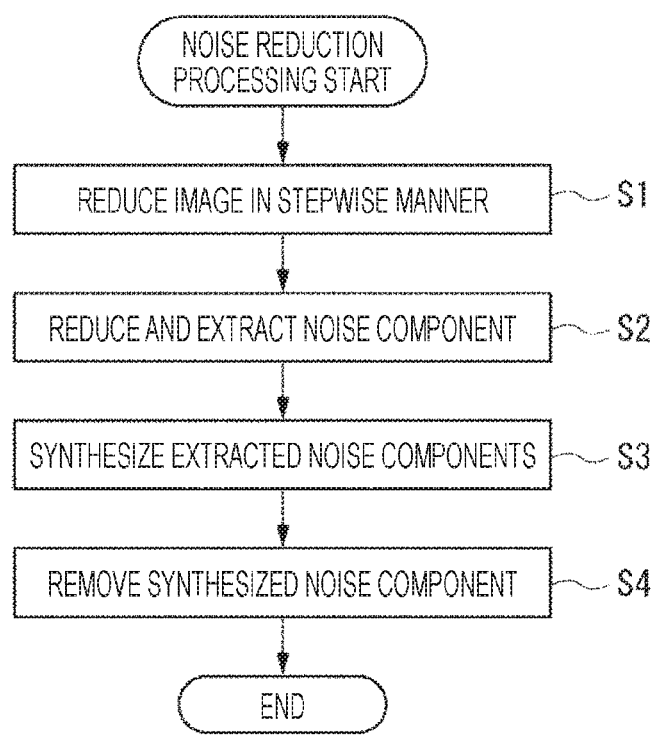
FIG. 2 is a flowchart for illustrating noise reduction processing executed by the image processing device.

Next, noise reduction processing executed by the image processing device 100 is described with reference to a flowchart in FIG. 2. Meanwhile, this processing starts, for example, when the original image from which the noise component is to be reduced is input to the input unit 101.

At step S1, the reduced image generation unit 103 reduces the image in a stepwise manner. Specifically, the input unit 101 supplies the original image to the NR 102 and the reduction unit 121a.

For example, the reduction unit 121a reduces the original image to half in longitudinal and lateral directions to generate the first reduced image. At that time, the reduction unit 121a limits a frequency band of the first reduced image, for example, by using a reduction filter 201a illustrated in FIG. 3. Specifically, the reduction filter 201a is a low-pass filter which reduces the frequency band of the image to half. Therefore, supposing that a sampling frequency of the original image is fs and a maximum frequency of the original image is ½ fs, a maximum frequency of the first reduced image is limited to ¼ fs.

The reduction unit 121a supplies the generated first reduced image to the reduction unit 121b, the NR 141a, and the subtraction unit 142a.

For example, the reduction unit 121b reduces the first reduced image to half in longitudinal and lateral directions to generate the second reduced image. At that time, the reduction unit 121b limits a frequency band of the second reduced image, for example, by using a reduction filter 201b illustrated in FIG. 3. Specifically, the reduction filter 201b is the same low-pass filter as the reduction filter 201a, and a maximum frequency of the second reduced image is limited to ⅛ fs.

The reduction unit 121b supplies the generated second reduced image to the reduction unit 121c, the NR 141b, and the subtraction unit 142b.

For example, the reduction unit 121c reduces the second reduced image to half in longitudinal and lateral directions to generate the third reduced image. At that time, the reduction unit 121c limits a frequency band of the third reduced image, for example, by using a reduction filter 201c illustrated in FIG. 3. Specifically, the reduction filter 201c is the same low-pass filter as the reduction filters 201a and 201b, and a maximum frequency of the third reduced image is limited to 1/16 fs.

The reduction unit 121c supplies the generated third reduced image to the NR 141c and the subtraction unit 142c.

Figure 4:
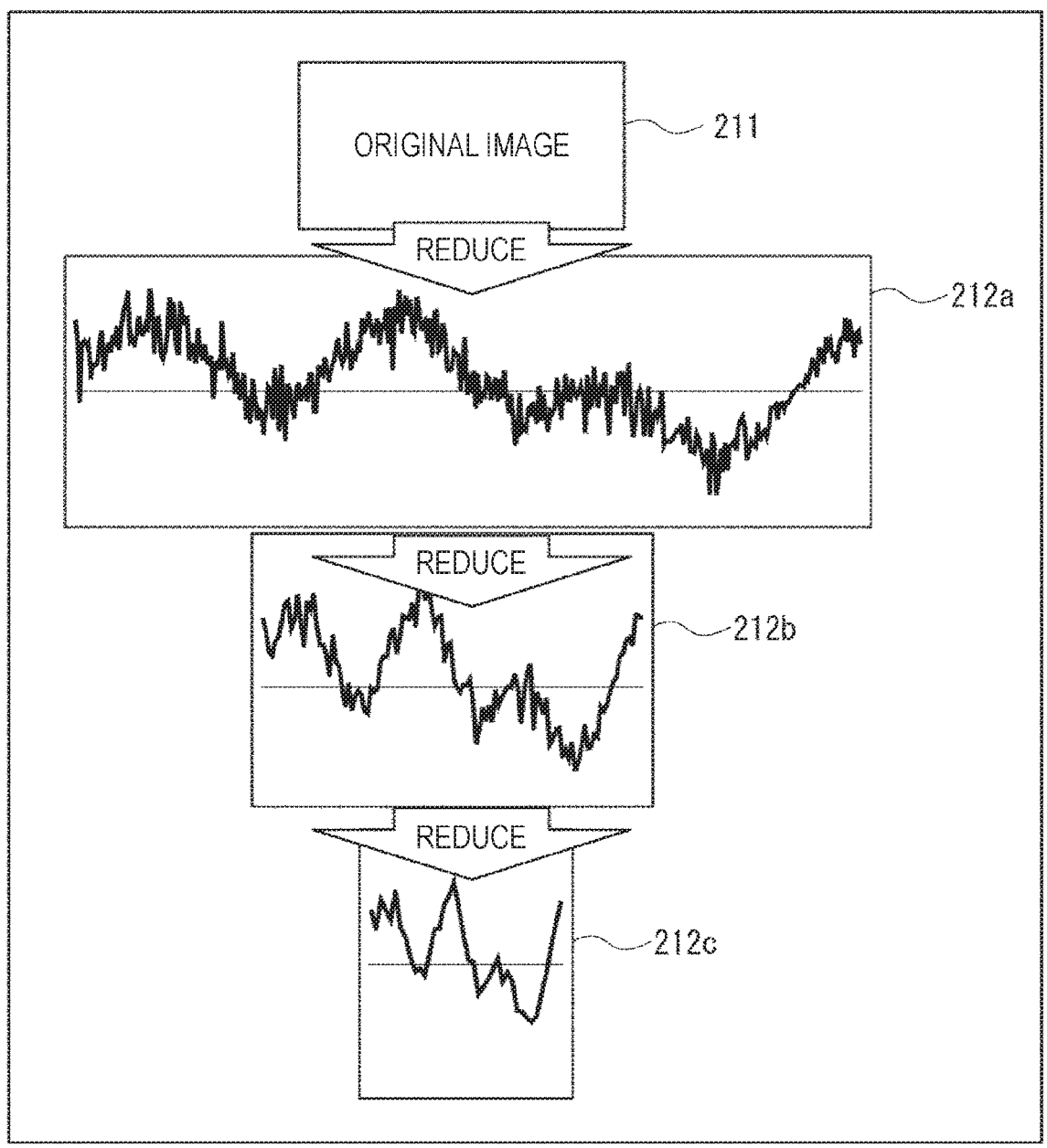
FIG. 4 is a graph illustrating an example of luminance distribution of a reduced image.

Graphs 212a to 212c in FIG. 4 illustrate examples of luminance distribution of the first reduced image, the second reduced image, and the third reduced image corresponding to the same position in the original image 211. The position in the image is plotted along the abscissa and the luminance is plotted along the ordinate in the graphs 212a to 212c.

As illustrated in the graphs 212a to 212c, a high-frequency component is removed as the image is reduced.

At step S2, the image processing device 100 reduces and extracts the noise component.

Figure 3:
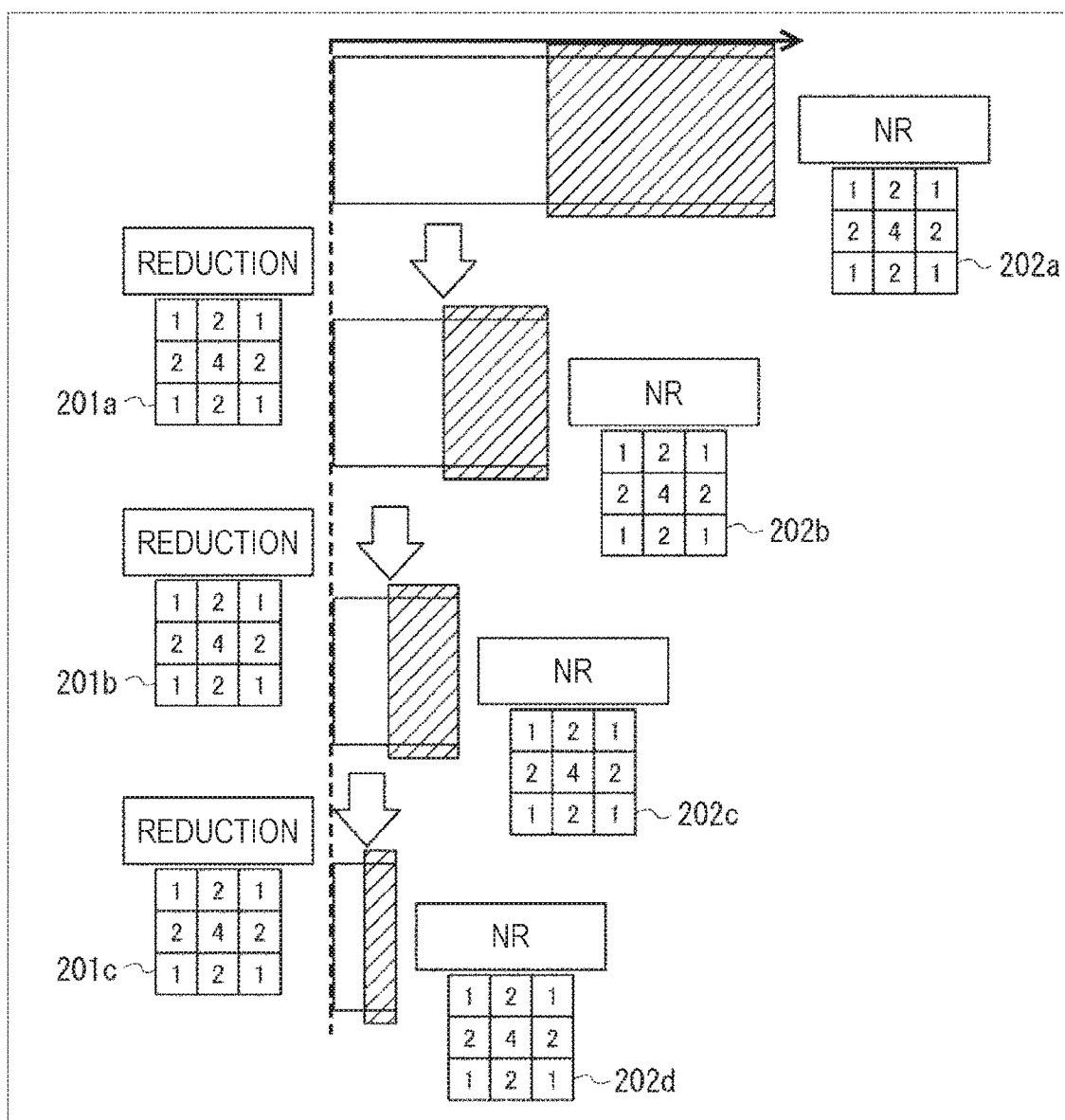
FIG. 3 is a view illustrating an example of a filter used for reducing an image and NR.

Specifically, for example, the NR 102 reduces the noise component in a predetermined frequency band of the original image (the first noise component) by using a noise filter 202a in FIG. 3 and supplies the original image after the noise reduction to the subtraction unit 106. In this example, the same filter as the reduction filter 201a used for reducing the original image is used as the noise filter 202a and high-frequency noise of the original image is reduced.

For example, the NR 141a reduces the noise component in a predetermined frequency band of the first reduced image by using a noise filter 202b in FIG. 3 and supplies the first reduced image after the noise reduction to the subtraction unit 142a. In this example, the same filter as the reduction filter 201b used for reducing the first reduced image is used as the noise filter 202b and high-frequency noise of the first reduced image is reduced.

The subtraction unit 142a obtains a difference between the first reduced image before the noise reduction and the first reduced image after the noise reduction, thereby extracting the noise component of the first reduced image (the second noise component). The subtraction unit 142a supplies the extracted second noise component to the addition unit 152a.

For example, the NR 141b reduces the noise component in a predetermined frequency band of the second reduced image by using a noise filter 202c in FIG. 3 and supplies the second reduced image after the noise reduction to the subtraction unit 142b. In this example, the same filter as the reduction filter 201c used for reducing the second reduced image is used as the noise filter 202c and high-frequency noise of the second reduced image is reduced.

The subtraction unit 142b obtains a difference between the second reduced image before the noise reduction and the second reduced image after the noise reduction, thereby extracting the noise component of the second reduced image (the third noise component). The subtraction unit 142b supplies the extracted third noise component to the addition unit 152b.

For example, the NR 141c reduces the noise component in a predetermined frequency band of the third reduced image by using a noise filter 202*d* in FIG. 3 and supplies the third reduced image after the noise reduction to the subtraction unit 142*c*. In this example, the same filter as the noise filters 202*a* to 202*c* is used as the noise filter 202*c* and high-frequency noise of the third reduced image is reduced.

The subtraction unit 142*c* obtains a difference between the third reduced image before the noise reduction and the third reduced image after the noise reduction, thereby extracting the noise component of the third reduced image (the fourth noise component). The subtraction unit 142*c* supplies the extracted fourth noise component to the enlarging unit 152*c*.

In this manner, the extraction units 131*a* to 131*c* individually extract the noise components of the first to third reduced images, respectively.

Also, the NR 102 and the extraction units 131*a* to 131*c* independently perform processing in parallel. In further detail, the NR 102 and the NRs 141*a* to 141*c* independently perform noise reduction processing in parallel.

A graph in the center in FIG. 3 schematically illustrates a relationship between the frequency bands of the original image and the first to third reduced images and the frequency bands of the first noise component to the fourth noise component. A square frame of the graph at the top indicates the frequency band of the original image and a hatched area indicates the frequency band of the first noise component. A square frame of the second graph indicates the frequency band of the first reduced image and a hatched area indicates the frequency band of the second noise component. A square frame of the third graph indicates the frequency band of the second reduced image and a hatched area indicates the frequency band of the third noise component. A square frame of the fourth graph indicates the frequency band of the third reduced image and a hatched area indicates the frequency band of the fourth noise component.

Herein, the reduction filter 201*a* applied to the original image and the noise filter 202*a* are made the same, the reduction filter 201*b* applied to the first reduced image and the noise filter 202*b* are made the same, the reduction filter 201*c* applied to the second reduced image and the noise filter 202*c* are made the same, so that the frequency bands of the first noise component, the second noise component, the third noise component, and the fourth noise component are orthogonal to one another and do not overlap with one another. For example, the frequency band of the first noise component ranges from ¼ fs to ½ fs. The frequency band of the second noise component ranges from ⅛ fs to ¼ fs. The frequency band of the third noise component ranges from 1/16 fs to ⅛ fs. The frequency band of the fourth noise component is in a range not higher than 1/16 fs. This prevents occurrence of overcorrection in which the noise components are redundantly reduced.

Figure 5:
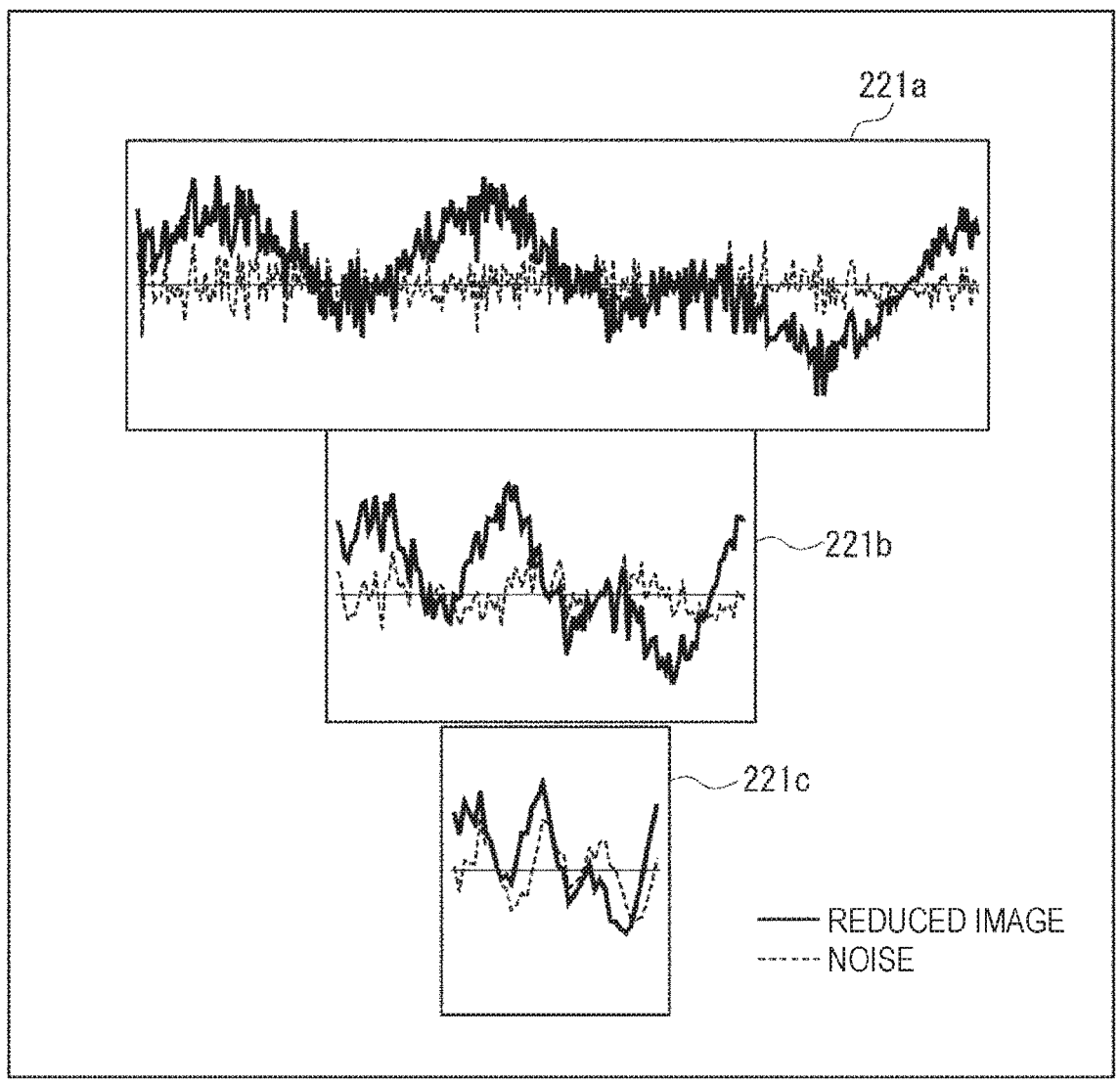
FIG. 5 is a graph illustrating an example of luminance distribution of a noise component extracted from the reduced image.

Dotted waveforms in graphs 221*a* to 221*c* in FIG. 5 indicate examples of luminance distribution of the noise components extracted from the first reduced image, the second reduced image, and the third reduced image in the example described above with reference to FIG. 4. The position in the image is plotted along the abscissa and the luminance is plotted along the ordinate in the graphs 221*a* to 221*c*. Also, the dotted waveform in the graph 221*a* indicates the luminance distribution of the second noise component, the dotted waveform in the graph 221*b* indicates the luminance distribution of the third noise component, and the dotted waveform in the graph 221*c* indicates the luminance distribution of the fourth noise component. Meanwhile, solid waveforms in the graphs 221*a* to 221*c* indicates the luminance distributions of the respective reduced images and are the same as the waveforms of the graphs 212*a* to 212*c* in FIG. 4.

At step S3, the noise synthesis unit 105 synthesizes the extracted noise components.

Specifically, the enlarging unit 151*c* enlarges the fourth noise component by up-sampling the same at the magnification opposite to that of the reduction unit 121*c* and converts the fourth noise component to the noise component in the frequency band in the second reduced image. The frequency band of the enlarged fourth noise component becomes a frequency band lower than that of the third noise component extracted from the second reduced image and do not overlap with the frequency band of the third noise component. The enlarging unit 151*c* supplies the enlarged fourth noise component to the addition unit 152*b*.

The addition unit 152*b* adds the third noise component to the enlarged fourth noise component and supplies the noise component after addition (the second synthesized noise component) to the enlarging unit 151*b*.

The enlarging unit 151*b* enlarges the second synthesized noise component by up-sampling the same at the magnification opposite to that of the reduction unit 121*b* and converts the second synthesized noise component to the noise component in the frequency band in the first reduced image. The frequency band of the enlarged second synthesized noise component becomes a frequency band lower than that of the second noise component extracted from the first reduced image and do not overlap with the frequency band of the second noise component. The enlarging unit 151*b* supplies the enlarged second synthesized noise component to the addition unit 152*b*.

The addition unit 152*a* adds the second noise component to the enlarged second synthesized noise component and supplies the noise component after addition (the first synthesized noise component) to the enlarging unit 151*a*.

The enlarging unit 151*a* enlarges the first synthesized noise component by up-sampling the same at the magnification opposite to that of the reduction unit 121*a* and converts the first synthesized noise component to the noise component in the frequency band in the original image. The frequency band of the enlarged first synthesized noise component becomes a frequency band lower than that of the first noise component extracted from the original image and do not overlap with the frequency band of the first noise component. The enlarging unit 151*a* supplies the enlarged first synthesized noise component to the subtraction unit 106.

In this manner, the noise synthesis unit 105 adds the noise component in order from the noise component of the smallest third reduced image while up-sampling the same at an enlargement factor opposite to a reduction factor when reducing the corresponding reduced image, thereby synthesizing the noise components. That is, the fourth noise component extracted from the third reduced image is up-sampled at the enlargement factor opposite to the reduction factor when reducing the third reduced image and is added to the third noise component extracted from the second reduced image. Also, the second synthesized noise component obtained by adding the third noise component to the fourth noise component is up-sampled at the enlargement factor opposite to the reduction factor when reducing the second reduced image and is added to the second noise component extracted from the first reduced image.

Figure 6:
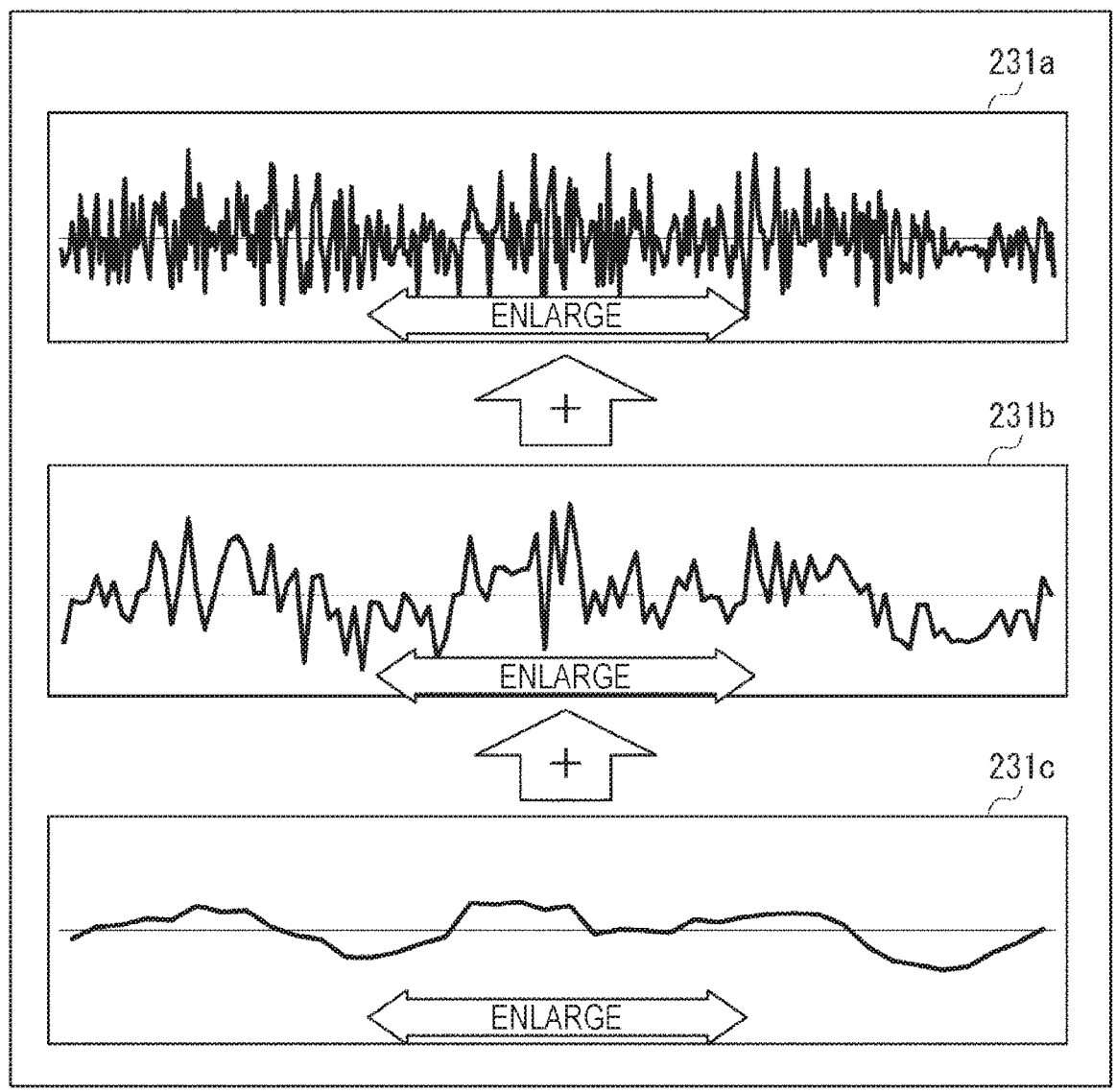
FIG. 6 is a graph illustrating an example of luminance distribution of each enlarged noise component.

Graphs 231*a* to 231*c* in FIG. 6 illustrate examples of luminance distribution of each enlarged noise component. The position in the image is plotted along the abscissa and the luminance is plotted along the ordinate in the graphs 231a to 231c. Specifically, the graph 231c illustrates the example of the luminance distribution in a case where the fourth noise component is enlarged to the noise component in the frequency band in the original image. The graph 231b illustrates the example of the luminance distribution in a case where the second synthesized noise component is enlarged to the noise component in the frequency band in the original image. The graph 231a illustrates the example of the luminance distribution in a case where the first synthesized noise component is enlarged to the noise component in the frequency band in the original image.

As illustrated in the example in FIG. 6, in the noise synthesis unit 105, the noise components in the respective frequency bands extracted from the extraction units 131a to 131c are synthesized while being propagated.

At step S4, the subtraction unit 106 removes the synthesized noise component. That is, the subtraction unit 106 removes the first synthesized noise component from the original image by obtaining a difference between the original image from which the noise component is reduced by the NR 102 and the first synthesized noise component. The subtraction unit 106 supplies the original image from which the first synthesized noise component is removed to the output unit 107. The output unit 107 outputs the supplied image as the output image to a subsequent device.

Figure 7:
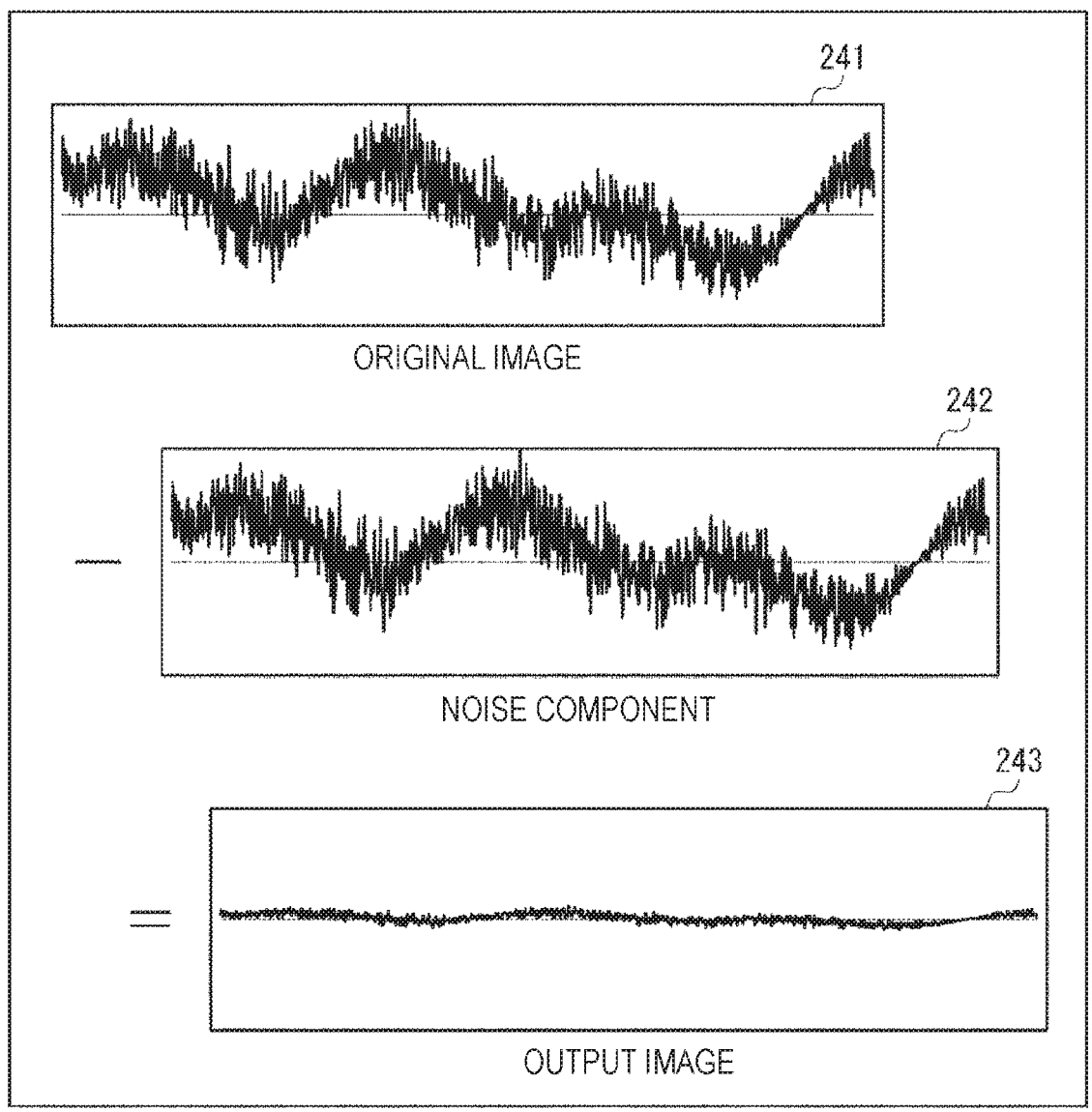
FIG. 7 is a graph illustrating an example of luminance distribution of an original image, a noise component, and an output image.

Graphs 241 to 243 in FIG. 7 illustrate examples of luminance distribution of the original image, the noise component, and the output image. The position in the image is plotted along the abscissa and the luminance is plotted along the ordinate in the graphs 241 to 243. Specifically, the graph 241 illustrates the example of the luminance distribution of the original image after the noise is reduced by the NR 102. The graph 242 illustrates the example of the luminance distribution of the first synthesized noise component. The graph 243 illustrates the example of the luminance distribution of the output image obtained after the first synthesized noise component illustrated in the graph 242 is removed from the original image illustrated in the graph 241.

Thereafter, the noise reduction processing is finished.

2. Comparison with Other Noise Reducing Method

Herein, with reference to FIGS. 8 to 11, the noise reducing method by the image processing device 100 is compared with another noise reducing method.

{Memory Used in Image Processing Device 100}

Figure 8:
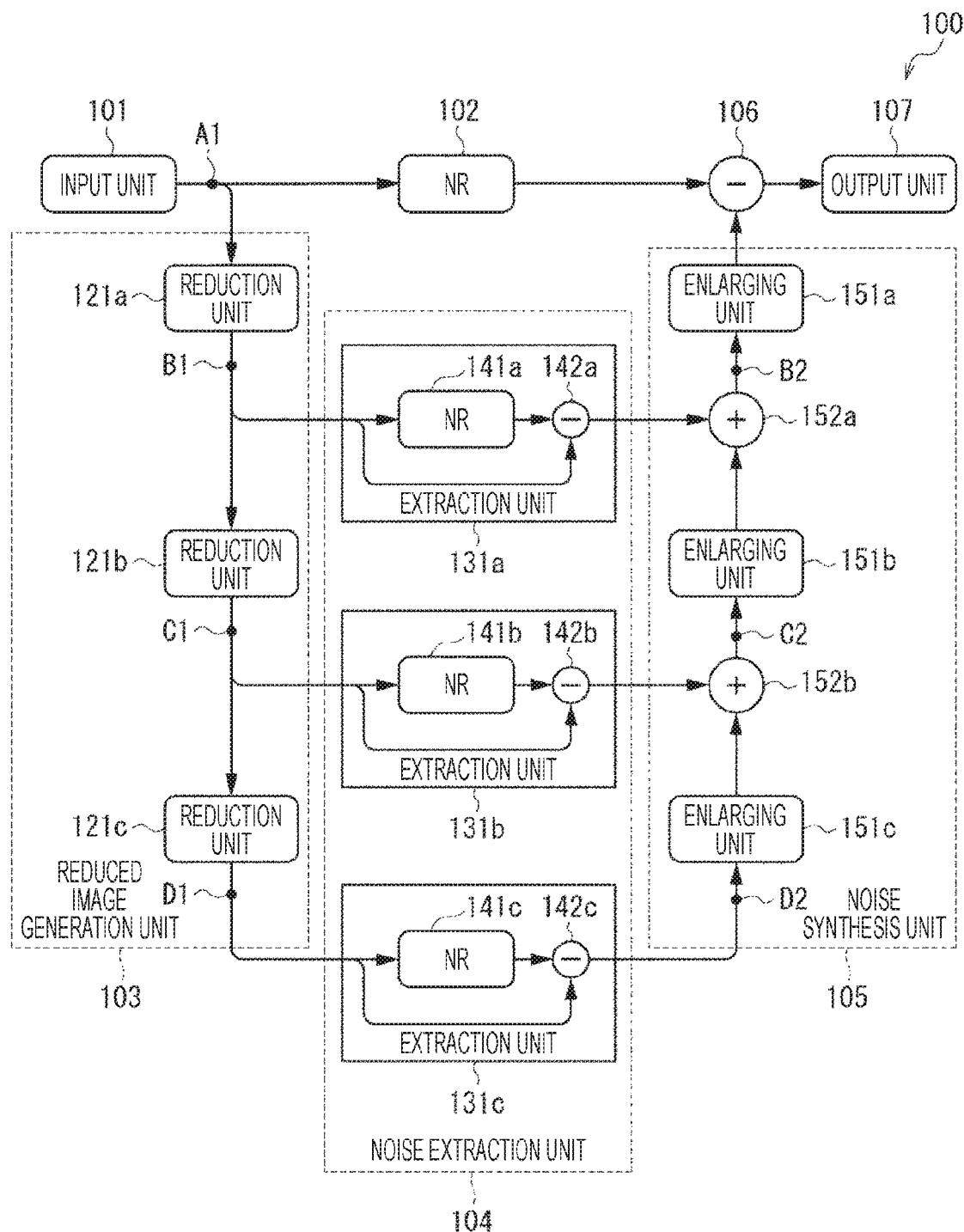
FIG. 8 is a view illustrating an example of a position in which a memory is used in the image processing device to which the present technology is applied.

FIG. 8 illustrates an example of a position in which a memory is used in the image processing device 100.

Specifically, in a position A1 before the NR 102 and the reduction unit 121a, a memory is used for an original image.

Also, in a position B1 before the reduction unit 121b and the NR 141a, a memory is used for the first reduced image. In a position B2 before the enlarging unit 151a, a memory is used for the first synthesized noise component having the same resolution as that of the first reduced image.

Furthermore, in a position C1 before the reduction unit 121c and the NR 141b, a memory is used for the second reduced image. In a position C2 before the enlarging unit 151b, a memory is used for the second synthesized noise component having the same resolution as that of the second reduced image.

Also, in a position D1 before the NR 141c, a memory is used for the third reduced image. In a position C2 before the enlarging unit 151c, a memory is used for the fourth noise component having the same resolution as that of the third reduced image.

{Comparison with Image Processing Device 300}

Figure 9:
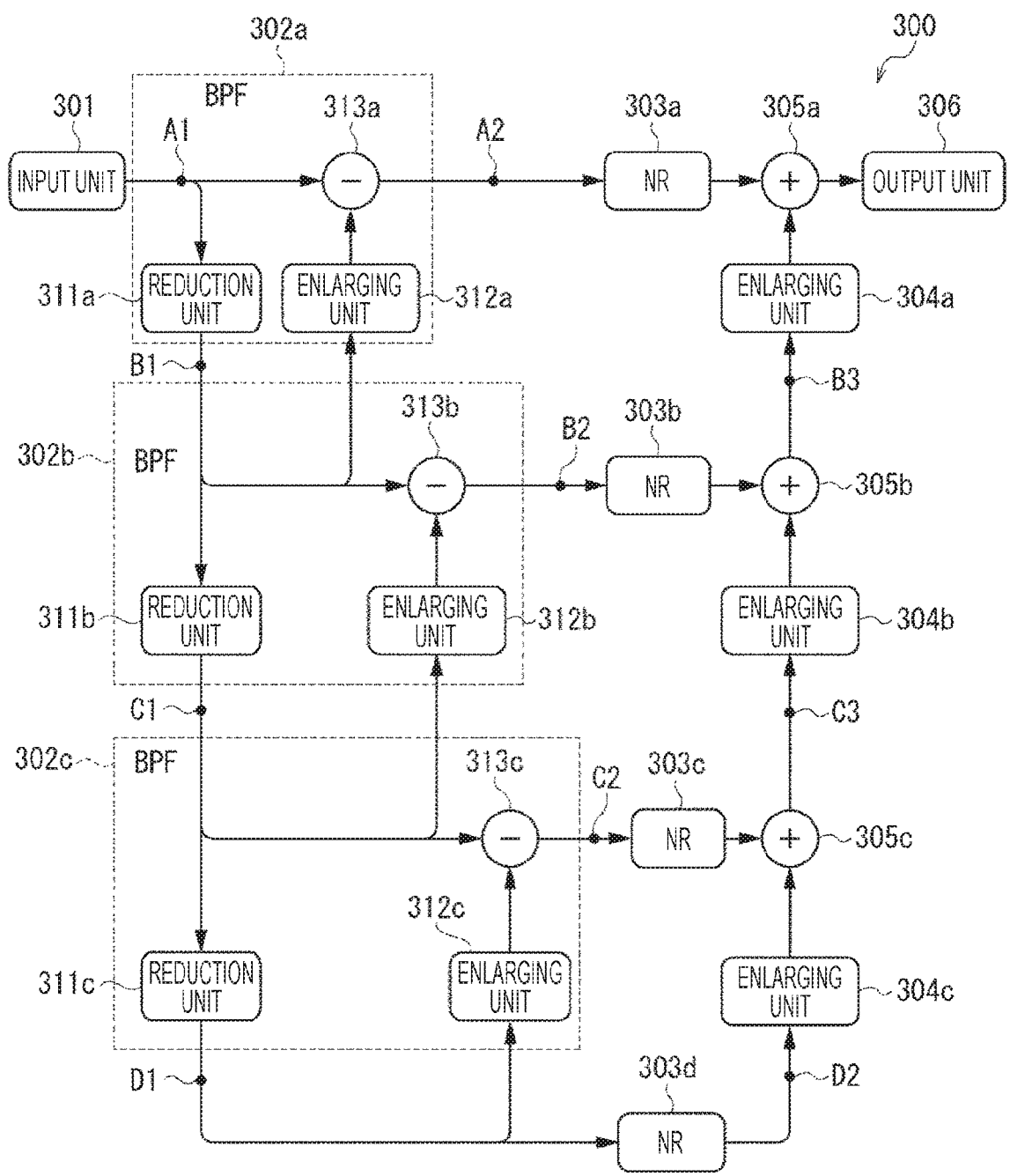
FIG. 9 is a block diagram illustrating a first configuration example of another image processing device.

FIG. 9 illustrates a configuration example of an image processing device 300. The image processing device 300 is provided with an input unit 301, bypass filters (BPFs) 302a to 302c, noise reductions (NRs) 303a to 303d, enlarging units 304a to 304c, addition units 305a to 305c, and an output unit 306. The BPF 302a is provided with a reduction unit 311a, an enlarging unit 312a, and a subtraction unit 313a. The BPF 302b is provided with a reduction unit 311b, an enlarging unit 312b, and a subtraction unit 313b. The BPF 302c is provided with a reduction unit 311c, an enlarging unit 312c, and a subtraction unit 313c.

The input unit 301 supplies an input original image to the reduction unit 311a and the subtraction unit 313a.

The reduction unit 311a reduces the original image at the same magnification as that of the reduction unit 121a of the image processing device 100 in FIG. 1. The reduction unit 311a supplies a reduced image (hereinafter referred to as a first reduced image) to the reduction unit 311b, the enlarging unit 312a, and the subtraction unit 313b.

The enlarging unit 312a enlarges the first reduced image at a magnification opposite to that of the reduction unit 311a and supplies the enlarged first reduced image to the subtraction unit 313a.

The subtraction unit 313a obtains a difference between the original image and the enlarged first reduced image and supplies an obtained image (hereinafter referred to as a high-frequency original image) to the NR 303a. The high-frequency original image is an image obtained by extracting a high-frequency component in a predetermined band from the original image.

The reduction unit 311b reduces the first reduced image at the same magnification as that of the reduction unit 121b of the image processing device 100 in FIG. 1. The reduction unit 311b supplies a reduced image (hereinafter referred to as a second reduced image) to the reduction unit 311c, the enlarging unit 312b, and the subtraction unit 313c.

The enlarging unit 312b enlarges the second reduced image at a magnification opposite to that of the reduction unit 311b and supplies the enlarged second reduced image to the subtraction unit 313b.

The subtraction unit 313b obtains a difference between the first reduced image and the enlarged second reduced image and supplies an obtained image (hereinafter referred to as a first high-frequency reduced image) to the NR 303b. The first high-frequency reduced image is an image obtained by extracting a high-frequency component in a predetermined band from the first reduced image.

The reduction unit 311c reduces the original image at the same magnification as that of the reduction unit 121c of the image processing device 100 in FIG. 1. The reduction unit 311c supplies a reduced image (hereinafter referred to as a third reduced image) to the enlarging unit 312c and the NR 303d.

The enlarging unit 312c enlarges the third reduced image at a magnification opposite to that of the reduction unit 311c and supplies the enlarged third reduced image to the subtraction unit 313c.

The subtraction unit 313c obtains a difference between the second reduced image and the enlarged third reduced image and supplies an obtained image (hereinafter referred to as a second high-frequency reduced image) to the NR 303c. The second high-frequency reduced image is an image obtained by extracting a high-frequency component in a predetermined band from the second reduced image.

The NR 303a reduces a noise component of the high-frequency original image and supplies the high-frequency original image after the noise reduction to the addition unit 305b.

The NR 303b reduces a noise component of the first high-frequency reduced image and supplies the first high-frequency reduced image after the noise reduction to the addition unit 305b.

The NR 303c reduces a noise component of the second high-frequency reduced image and supplies the second high-frequency reduced image after the noise reduction to the addition unit 305c.

The NR 303d reduces a noise component of the third reduced image and supplies the third reduced image after the noise reduction to the enlarging unit 304c.

Therefore, the NRs 303a to 303d reduce the noise components in different frequency bands of the original image, respectively.

The enlarging unit 304c enlarges the third reduced image after the noise reduction at a magnification opposite to that of the reduction unit 311c and supplies the enlarged third reduced image to the addition unit 305c.

The addition unit 305c adds the second high-frequency reduced image after the noise reduction to the enlarged third reduced image and supplies the image after addition (hereinafter referred to as a second synthesized image) to the enlarging unit 304b.

The enlarging unit 304b enlarges the second synthesized image at a magnification opposite to that of the reduction unit 311b and supplies the enlarged second synthesized image to the addition unit 305b.

The addition unit 305b adds the second high-frequency reduced image after the noise reduction to the enlarged second synthesized image and supplies an image after addition (hereinafter referred to as a first synthesized image) to the enlarging unit 304a.

The enlarging unit 304a enlarges the first synthesized image at a magnification opposite to that of the reduction unit 311a and supplies the enlarged first synthesized image to the addition unit 305a.

The addition unit 305a adds the high-frequency original image after the noise reduction to the enlarged first synthesized image and supplies an image after addition to the output unit 306.

The output unit 306 outputs the image supplied from the addition unit 305a as an output image.

In the image processing device 300, in a position A1 before the reduction unit 311a, a memory is used for the original image. In a position A2 before the NR 303a, a memory is used for the high-frequency original image having the same resolution as that of the original image.

Also, in a position B1 before the reduction unit 311b and the enlarging unit 312a, a memory is used for the first reduced image. In a position B2 before the NR 303b, a memory is used for the first high-frequency reduced image having the same resolution as that of the first reduced image. In a position B3 before the enlarging unit 304a, a memory is used for the first synthesized image having the same resolution as that of the first reduced image.

Furthermore, in a position C1 before the reduction unit 311c and the enlarging unit 312b, a memory is used for the second reduced image. In a position C2 before the NR 303c, a memory is used for the second high-frequency reduced image having the same resolution as that of the second reduced image. In a position C3 before the enlarging unit 304b, a memory is used for the second synthesized image having the same resolution as that of the second reduced image.

Also, memories are used for the third reduced image in a position D1 before the enlarging unit 312c and the NR 303d and a position D2 before the enlarging unit 304c.

Comparing FIG. 8 with FIG. 9, the image processing device 100 uses a smaller memory amount than the image processing device 300. Also, in the image processing device 100, the BPF is not used unlike in the image processing device 300. Therefore, the image processing device 100 may reduce a circuit scale and an arithmetic amount as compared with the image processing device 300.

Also, in the image processing device 300, the NRs 303a to 303c independently reduce the noise components in the respective frequency bands extracted by the BPFs 302a to 302c. Therefore, in the NRs 303a to 303c, only AC components are subject to the noise reduction, so that performance of the noise reduction processing becomes unstable. Also, in the image processing device 300, a noise reduction effect depends on performance of the BPFs 302a to 302c. However, since it is difficult to completely separate pass bands of the BPFs 302a to 302c, for example, a frequency band in which noise is redundantly reduced is generated, and the noise reduction effect is deteriorated due to overcorrection.

On the other hand, in the image processing device 100, the BPF is not used as described above. Also, the NR 102 performs the noise reduction of the original image, and the NRs 141a to 141c perform the noise reduction of the reduced image. Therefore, noise reduction targets of the NR 102 and the NRs 141a to 141c are DC components and the AC components, so that performance of the NR 102 and the NRs 141a to 141c is stabilized.

As described above, the image processing device 100 is excellent in noise reduction effect as compared to the image processing device 300 and may decrease the circuit scale and the arithmetic amount.

{Comparison with Image Processing Device 400}

Figure 10:
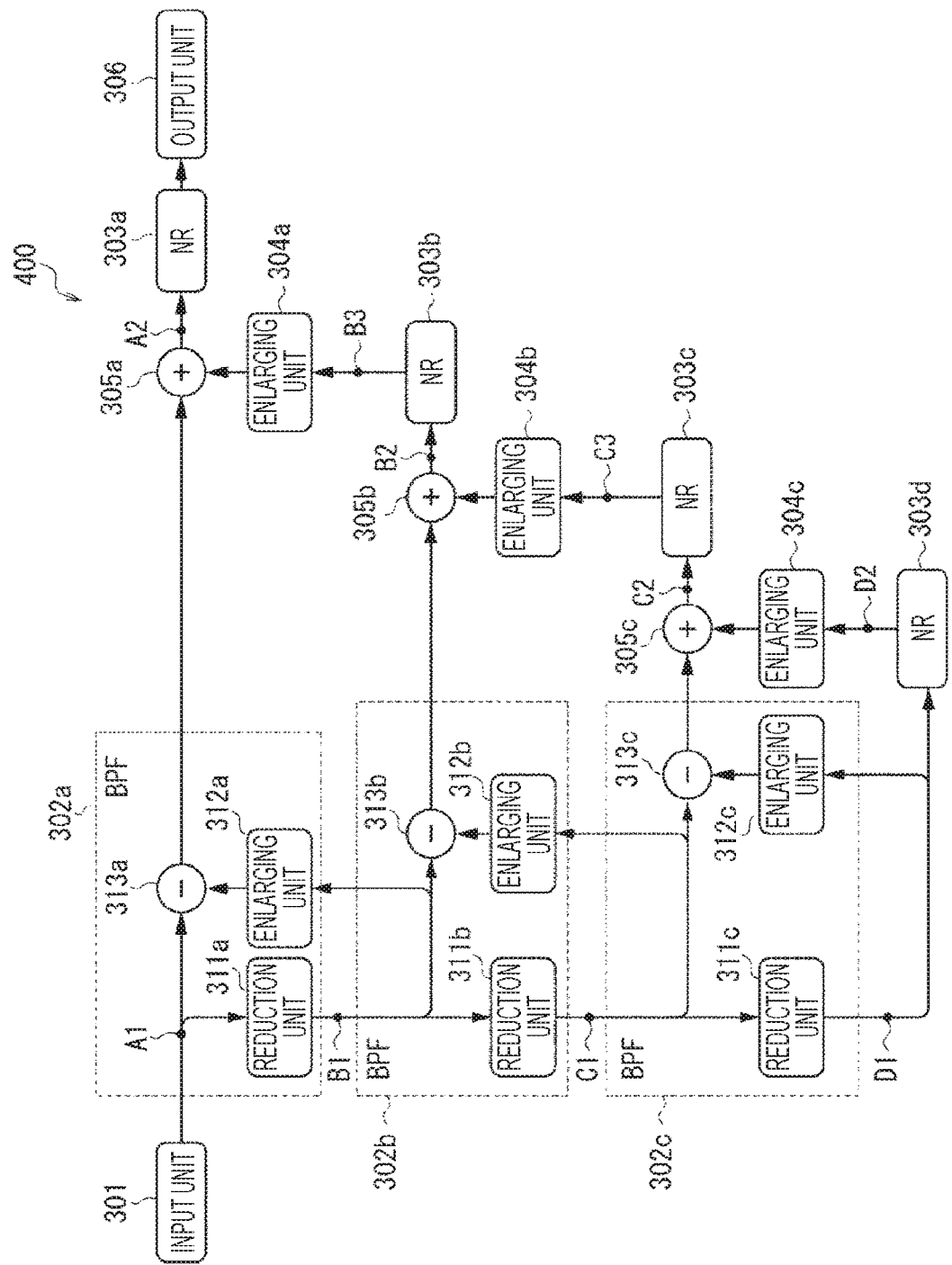
FIG. 10 is a block diagram illustrating a second configuration example of another image processing device.

FIG. 10 illustrates a configuration example of an image processing device 400. Meanwhile, in the drawing, a portion corresponding to that in FIG. 9 is assigned with the same reference sign.

The image processing device 400 differs from the image processing device 300 in FIG. 9 in positions of the NRs 303a to 303c and the addition units 305a to 305c.

Out of the processing of the image processing device 400, the processing different from that of the image processing device 300 is herein especially described.

The BPF 302a generates the high-frequency original image and the first reduced image as described above. The BPF 302a supplies the high-frequency original image to the addition unit 305a and supplies the first reduced image to the reduction unit 311b and the subtraction unit 313b.

The BPF 302b generates the first high-frequency reduced image and the second reduced image as described above. The BPF 302b supplies the first high-frequency reduced image to the addition unit 305b and supplies the second reduced image to the reduction unit 311c and the subtraction unit 313c.

The BPF 302c generates the second high-frequency reduced image and the third reduced image as described above. The BPF 302c supplies the second high-frequency reduced image to the addition unit 305c and supplies the third reduced image to the NR 303d.

The NR 303d reduces a noise component of the third reduced image and supplies the third reduced image after the noise reduction to the enlarging unit 304c.

The enlarging unit 304c enlarges the third reduced image after the noise reduction at a magnification opposite to that of the reduction unit 311c and supplies the enlarged third reduced image to the addition unit 305c.

The addition unit 305c adds the second high-frequency reduced image to the enlarged third reduced image and supplies an image after addition (hereinafter referred to as a third synthesized image) to the NR 303c. Meanwhile, the third synthesized image is the same as the second synthesized image in the image processing device 300 in FIG. 9.

The NR 303c reduces a noise component of the third synthesized image and supplies the third synthesized image after the noise reduction to the enlarging unit 304b.

The enlarging unit 304b enlarges the third synthesized image at the magnification opposite to that of the reduction unit 311b and supplies the enlarged third synthesized image to the addition unit 305b.

The addition unit 305b adds the first high-frequency reduced image to the third synthesized image and supplies an image after addition (hereinafter referred to as a second synthesized image) to the NR 303b.

The NR 303b reduces a noise component of the second synthesized image and supplies the second synthesized image after the noise reduction to the enlarging unit 304a.

The enlarging unit 304a enlarges the second synthesized image at the magnification opposite to that of the reduction unit 311a and supplies the enlarged second synthesized image to the addition unit 305a.

The addition unit 305a adds the high-frequency original image to the enlarged second synthesized image and supplies the image after addition (hereinafter referred to as a first synthesized image) to the NR 303a.

The NR 303a reduces a noise component of the first synthesized image and supplies the first synthesized image after the noise reduction to the output unit 306.

The output unit 306 outputs the first synthetic image after the noise reduction as the output image to the subsequent device.

In the image processing device 400, a memory is used for the original image in a position A1 before the reduction unit 311a. In a position A2 before the NR 303a, a memory is used for the first synthesized image having the same resolution as that of the original image.

Also, in a position B1 before the reduction unit 311b and the enlarging unit 312a, a memory is used for the first reduced image. The memories are used for the second synthesized image having the same resolution as that of the first reduced image in a position B2 before the NR 303b and a position B3 before the enlarging unit 304a.

Furthermore, in a position C1 before the reduction unit 311c and the enlarging unit 312b, a memory is used for the second reduced image. Memories are used for the third synthesized image having the same resolution as that of the second reduced image in a position C2 before the NR 303c and a position C3 before the enlarging unit 304b.

Also, memories are used for the third reduced image in a position D1 before the enlarging unit 312c and the NR 303d and a position D2 before the enlarging unit 304c.

Comparing FIG. 8 with FIG. 10, the image processing device 100 uses a smaller memory amount than the image processing device 400. In the image processing device 100, the BPF is not used unlike in the image processing device 400. Therefore, the image processing device 100 may reduce the circuit scale and the arithmetic amount as compared with the image processing device 400.

Also, in the image processing device 400, as in the image processing device 300, the noise reduction effect depends on the performance of the BPFs 302a to 302c, and as a result, the noise reduction effect is deteriorated. On the other hand, since the BPF is not used in the image processing device 100, the noise reduction effect is not deteriorated.

Furthermore, in the image processing device 400, as in the image processing device 300, the noise reduction effect depends on the performance of the BPFs 302a to 302c, so that the noise reduction effect is deteriorated.

Also, in the image processing device 400, the NRs 303a to 303d sequentially perform processing. That is, the NR 303c performs the processing after the processing of the NR 303d finishes, the NR 303b performs the processing after the processing of the NR 303c finishes, and the NR 303a performs the processing after the processing of the NR 303b finishes. Therefore, the stand-by time for the processing becomes longer, and the used amount of the memory further increases.

On the other hand, in the image processing device 100, as described above, the NR 102 and the NRs 141a to 141c independently perform the processing in parallel, so that it is possible to shorten the stand-by time and reduce the used amount of the memory.

As described above, the image processing device 100 is excellent in noise reduction effect as compared to the image processing device 400, and may increase a processing speed and decrease the circuit scale and the arithmetic amount.

{Comparison with Image Processing Device 500}

Figure 11:
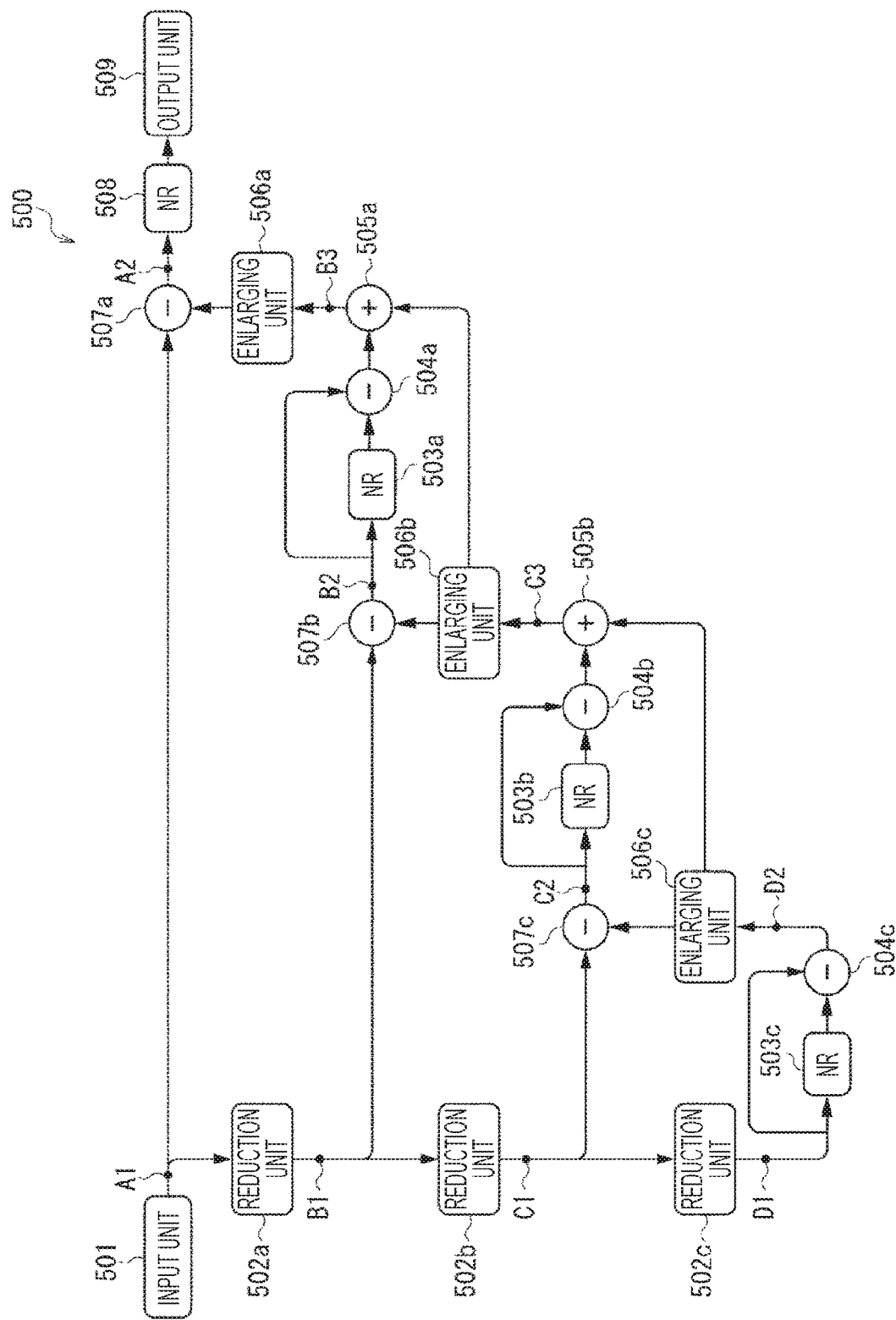
FIG. 11 is a block diagram illustrating a third configuration example of another image processing device.

FIG. 11 illustrates a configuration example of an image processing device 500. Meanwhile, the image processing device 500 is modeled after the image processing device disclosed in Patent Document 1 described above.

The image processing device 500 is provided with an input unit 501, reduction units 502a to 502c, noise reductions (NRs) 503a to 503c, subtraction units 504a to 504c, addition units 505a and 505b, enlarging units 506a to 506c, subtraction units 507a to 507c, a noise reduction (NR) 508, and an output unit 509.

The input unit 501 supplies an input original image to the reduction unit 502a and the subtraction unit 507a.

The reduction unit 502a reduces the original image at the same magnification as that of the reduction unit 121a of the image processing device 100 in FIG. 1. The reduction unit 502a supplies a reduced image (hereinafter referred to as a first reduced image) to the reduction unit 502b and the subtraction unit 507b.

The reduction unit 502b reduces the first reduced image at the same magnification as that of the reduction unit 121b of the image processing device 100 in FIG. 1. The reduction unit 502b supplies a reduced image (hereinafter referred to as a second reduced image) to the reduction unit 502c and the subtraction unit 507c.

The reduction unit 502c reduces the original image at the same magnification as that of the reduction unit 121c of the image processing device 100 in FIG. 1. The reduction unit 502c supplies a reduced image (hereinafter referred to as a third reduced image) to the NR 503c and the subtraction unit 504c.

The NR 503c reduces a noise component of the third reduced image and supplies the third reduced image after the noise reduction to the subtraction unit 504c.

The subtraction unit 504c obtains a difference between the third reduced image before the noise reduction and the third reduced image after the noise reduction, thereby extracting the noise component of the third reduced image (hereinafter referred to as a third noise component). The subtraction unit 504c supplies the extracted third noise component to the enlarging unit 506c.

The enlarging unit 506c enlarges the third noise component by up-sampling the same at a magnification opposite to that of the reduction unit 502c and converts the third noise component to a noise component in a frequency band in the second reduced image. The enlarging unit 506c supplies the enlarged third noise component to the subtraction unit 507c and the addition unit 505b.

The subtraction unit 507c obtains a difference between the second reduced image and the enlarged third noise component, thereby removing the third noise component from the second reduced image. The subtraction unit 507c supplies the second reduced image after the noise removal to the NR 503b and the subtraction unit 504b.

The NR 503b reduces a noise component of the second reduced image and supplies the second reduced image after the noise reduction to the subtraction unit 504b.

The subtraction unit 504b obtains a difference between the second reduced image before the noise reduction and the second reduced image after the noise reduction, thereby extracting the noise component of the second reduced image after the removal of the third noise component (hereinafter, referred to as a second noise component). The subtraction unit 504b supplies the extracted second noise component to the addition unit 505b.

The addition unit 505b adds the second noise component to the enlarged third noise component and supplies a noise component after addition (hereinafter referred to as a second synthesized noise component) to the enlarging unit 506b.

The enlarging unit 506b enlarges the second synthesized noise component by up-sampling the same at a magnification opposite to that of the reduction unit 502b and converts the second synthesized noise component to a noise component in a frequency band in the first reduced image. The enlarging unit 506b supplies the enlarged second synthesized noise component to the subtraction unit 507b and the addition unit 505a.

The subtraction unit 507c obtains a difference between the first reduced image and the enlarged second synthesized noise component, thereby removing the second synthesized noise component from the first reduced image. The subtraction unit 507b supplies the first reduced image after the noise removal to the NR 503a and the subtraction unit 504a.

The NR 503a reduces a noise component of the first reduced image and supplies the first reduced image after the noise reduction to the subtraction unit 504a.

The subtraction unit 504b obtains a difference between the first reduced image before the noise reduction and the first reduced image after the noise reduction, thereby extracting the noise component of the first reduced image after the removal of the second synthesized noise component (hereinafter, referred to as a first noise component). The subtraction unit 504a supplies the extracted first noise component to the addition unit 505a.

The addition unit 505a adds the first noise component to the enlarged second synthesized noise component and supplies a noise component after addition (hereinafter referred to as a first synthesized noise component) to the enlarging unit 506a.

The enlarging unit 506a enlarges the first synthesized noise component by up-sampling the same at a magnification opposite to that of the reduction unit 121a, thereby converting the first synthesized noise component to a noise component in a frequency band in the original image. The enlarging unit 506a supplies the enlarged first synthesized noise component to the subtraction unit 507a.

The subtraction unit 507a obtains a difference between the original image and the enlarged first synthesized noise component, thereby removing the first synthesized noise component from the original image. The subtraction unit 507a supplies the original image after the noise removal to the NR 508.

The NR 508 reduces a noise of the original image after the removal of the first synthesized noise component and supplies the original image after the noise reduction to the output unit 509.

The output unit 509 outputs the original image after the noise reduction as the output image.

As described above, the image processing device 500 propagates the extracted noise component in each frequency band as in the image processing device 100, but this is greatly different from the image processing device 100 in that the NRs 503a to 503c and the NR 508 sequentially perform the processing. Therefore, a used amount of the memory increases.

Specifically, in the image processing device 500, a memory is used for the original image in a position A1 before the reduction unit 502a and a position A2 before the NR 508.

Also, memories are used for the first reduced image in a position B1 before the reduction unit 502b and a position B2 before the NR 503a. In a position B3 before the enlarging unit 506a, a memory is used for the first synthesized noise component having the same resolution as that of the first reduced image.

Furthermore, memories are used for the second reduced image in a position C1 before the reduction unit 502c and a position C2 before the NR 503b. In a position C3 before the enlarging unit 506b, a memory is used for the second synthesized noise component having the same resolution as that of the second reduced image.

Also, memories are used for the third reduced image in a position D1 before the NR 503c and a position D2 before the enlarging unit 506c.

Comparing FIG. 8 with FIG. 11, the image processing device 100 uses a smaller memory amount than the image processing device 500. Therefore, the image processing device 100 may reduce the circuit scale as compared with the image processing device 500.

Also, in the image processing device 500, since the NRs 503a to 503c and the NR 508 sequentially perform processing, stand-by time for the processing becomes longer and the used amount of the memory further increases.

As described above, the image processing device 100 may increase the processing speed and reduce the circuit scale as compared with the image processing device 500. Also, the noise reduction effect of the image processing device 100 and that of the image processing device 500 are substantially equivalent to each other.

3. Variation

Hereinafter, a variation of the above-described embodiment of the present technology is described.

In the description above, the example in which the reduction factors of all the reduction units 121a to 121c are the same is described, but they are not necessarily the same. Furthermore, in the above description, the example in which the enlargement factors of all the enlarging units 151a to 151c are the same is described, but they are not necessary the same. However, the reduction factor and the enlargement factor of the reduction unit and the enlarging unit forming a pair (for example, the reduction unit 121a and the enlarging unit 151a) must be in a relationship of inverse numbers.

Also, although the example in which all the filters used by the reduction units 121a to 121c are the same is described above, they are not necessarily the same. Similarly, the filters used by the enlarging units 151a to 151c are not necessarily the same. Furthermore, in the description above, the example in which the filter for reducing and the filter for NR applied to the same image are the same is described, but they are not required to be the same. However, it is necessary to select the filter for reducing and the filter for NR so that the frequency bands reduced by the respective NRs decrease are orthogonal.

Also, although the example in which the image is reduced in three steps and the noise component is extracted from each reduced image is described in the description above, the number of steps for reducing the image may be set to an arbitrary value not smaller than one.

Meanwhile, the present technology is applicable to various devices, systems, software and the like having a function of reducing the image noise.

{Configuration Example of Computer}

A series of processes described above may be executed by hardware or by software.

Figure 12:
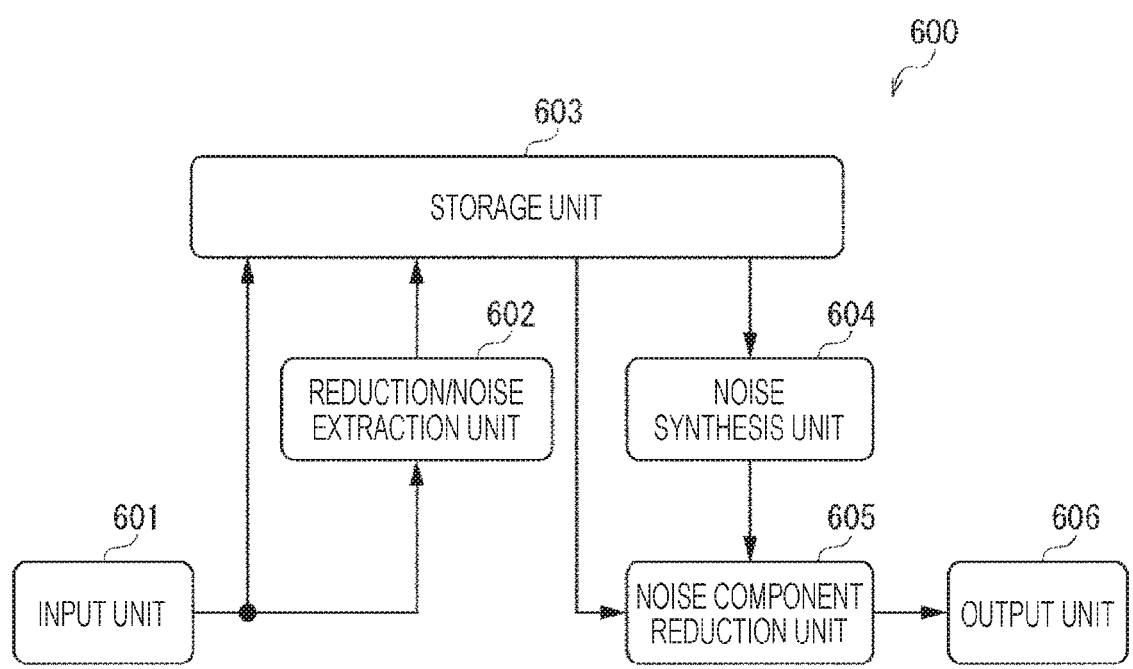
FIG. 12 is a block diagram illustrating an example of function sharing in a case where the image processing device to which the present technology is applied is configured by hardware.

FIG. 12 is a block diagram illustrating an example of function sharing in a case where the image processing device 100 is configured by hardware. An image processing device 600 in FIG. 12 is provided with an input unit 601, a reduction/noise extraction unit 602, a storage unit 603, a noise synthesis unit 604, a noise component subtraction unit 605, and an output unit 606.

The input unit 601 corresponds to the input unit 101 of the image processing device 100. The reduction/noise extraction unit 602 includes the reduced image generation unit 103 and a noise extraction unit 104 of the image processing device 100. The storage unit 603 is configured by SRAM and DRAM, for example, and is used for storing data in the positions A1 to D2 in FIG. 8. The noise synthesis unit 604 corresponds to the noise synthesis unit 105 of the image processing device 100. The noise component subtraction unit 605 includes the NR 102 and the subtraction unit 106 of the image processing device 100. The output unit 606 corresponds to the output unit 606 of the image processing device 100.

Also, in a case where a series of processes is performed by software, a program which configures the software is installed on a computer. Herein, the computer includes a computer built in dedicated hardware, a general-purpose personal computer, for example, capable of executing various functions by various programs installed and the like.

Figure 13:
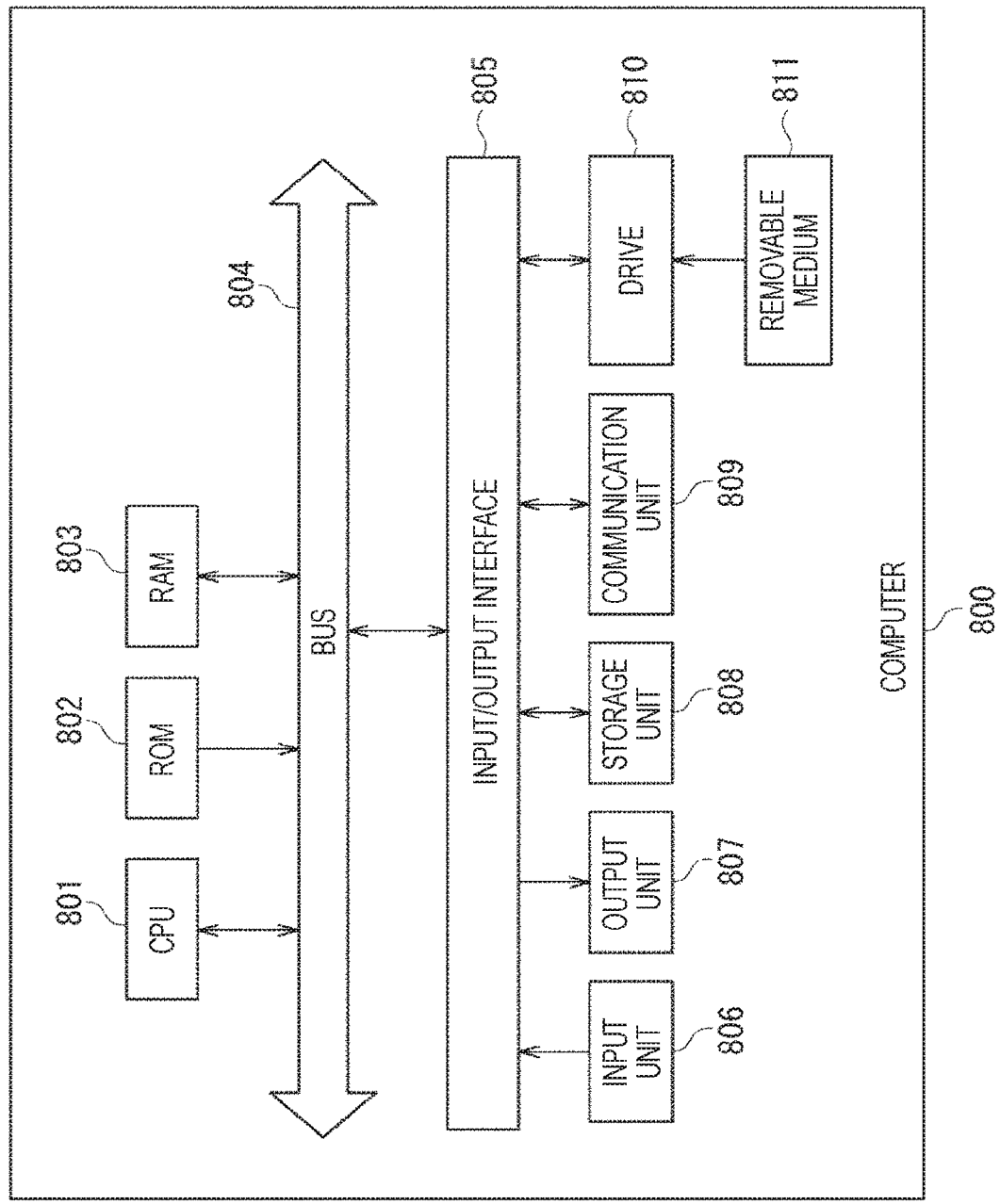
FIG. 13 is a block diagram illustrating a configuration example of a computer.

FIG. 13 is a block diagram illustrating a configuration example of hardware of a computer 800 which executes the above-described series of processes by a program.

In the computer 800, a central processing unit (CPU) 801, a read only memory (ROM) 802, and a random-access memory (RAM) 803 are connected to one another through a bus 804.

An input/output interface 805 is further connected to the bus 804. An input unit 806, an output unit 807, a storage unit 808, a communication unit 809, and a drive 810 are connected to the input/output interface 805.

The input unit 806 includes a keyboard, a mouse, a microphone and the like. The output unit 807 includes a display, a speaker and the like. The storage unit 808 includes a hard disk, a non-volatile memory and the like. The communication unit 809 includes a network interface and the like. The drive 810 drives a removable medium 811 such as a magnetic disk, an optical disk, a magnetooptical disk, or a semiconductor memory.

In the computer 800 configured in the above-described manner, the CPU 801 loads the program stored in the storage unit 808, for example, on the RAM 803 through the input/output interface 805 and the bus 804 to execute, so that a series of processes described above is performed.

The program executed by the computer 800 (CPU 801) may be recorded on the removable medium 811 as a package medium and the like to be provided, for example. Also, the program may be provided by means of a wired or wireless transmission medium such as a local region network, the Internet, and digital broadcasting.

In the computer 800, the program may be installed on the storage unit 808 through the input/output interface 805 by mounting the removable medium 811 on the drive 810. Also, the program may be received by the communication unit 809 through the wired or wireless transmission medium to be installed on the storage unit 808. In addition, the program may be installed in advance on the ROM 802 and the storage unit 808.

Meanwhile, the program executed by the computer 800 may be the program of which processes are performed in chronological order in the order described in this specification or may be the program of which processes are performed in parallel or at required timing such as when a call is issued.

Also, in this specification, a system is intended to mean assembly of a plurality of components (devices, modules (parts) and the like) and it does not matter whether all the components are in the same casing. Therefore, a plurality of devices stored in different casings connected through the network and one device obtained by storing a plurality of modules in one casing are the systems.

Furthermore, the embodiments of the present technology are not limited to the above-described embodiment and various modifications may be made without departing from the gist of the present technology.

For example, the present technology may be configured as cloud computing in which a function is shared by a plurality of devices through the network to process together.

Also, each step described in the above-described flowchart may be executed by one device or executed by a plurality of devices in a shared manner.

Furthermore, in a case where a plurality of processes is included in one step, a plurality of processes included in one step may be executed by one device or by a plurality of devices in a shared manner.

Also, the effect described in this specification is illustrative only and is not limitative; there may also be another effect.

Furthermore, the present technology may also have following configurations, for example.

(1)

An image processing device provided with:

a reduced image generation unit which reduces an original image in a stepwise manner to generate one or more n reduced images;

a noise reduction unit which reduces a noise component in a predetermined frequency band of the original image;

a noise extraction unit which performs processing of extracting a noise component in a predetermined frequency band from each of the reduced images in parallel;

a noise synthesis unit which synthesizes noise components extracted from the respective reduced images; and a subtraction unit which subtracts a synthesized noise component from the original image after noise reduction.

(2)

The image processing device according to (1) described above, in which frequency bands of the noise components extracted from the respective reduced images are not overlapped with a frequency band in which the noise component is reduced by the noise reduction unit and a frequency band of the noise component extracted from another reduced image.

(3)

The image processing device according to (2) described above, in which the noise reduction unit reduces the noise component of the original image by using a filter the same as a filter used for reducing the original image, and the noise extraction unit extracts the noise component of each of the reduced images by using a filter the same as a filter used for reducing each of the reduced images.

(4)

The image processing device according to any one of (1) to (3) described above, in which the noise extraction unit is provided with n extraction units which individually extract the noise components of the respective reduced images, and the noise reduction unit and the n extraction units independently perform processing in parallel.

(5)

The image processing device according to any one of (1) to (4) described above, in which the noise synthesis unit synthesizes the noise components by adding the noise components in order from the noise component of the smallest reduced image while up-sampling at an enlargement factor opposite to a reduction factor when reducing the corresponding reduced image in a case of n≥2.

(6)

An image processing method provided with:

a reduced image generating step of reducing an original image in a stepwise manner to generate one or more n reduced images;

a noise reducing step of reducing a noise component in a predetermined frequency band of the original image;

a noise extracting step of performing processing of extracting a noise component in a predetermined frequency band from each of the reduced images in parallel;

a noise synthesizing step of synthesizing noise components extracted from the respective reduced images; and a subtracting step of subtracting a synthesized noise component from the original image after noise reduction.

REFERENCE SIGNS LIST

100 Image processing device
102 Reduced image generation unit
103 Noise extraction unit
104 Noise synthesis unit
105 Noise reduction
106 Subtraction unit
121a to 121c Reduction unit
131a to 131c Extraction unit
141a to 141c Noise reduction
142a to 142c Subtraction unit
151a to 151c Enlarging unit
152a, 152b Addition unit
600 Image processing device
602 Reduction/noise extraction unit
604 Noise synthesis unit
605 Noise component subtraction unit

The invention claimed is:

1. An image processing device comprising:

a reduced image generation unit which reduces an original image in a stepwise manner to generate one or more n reduced images;

a noise reduction unit which reduces a noise component in a predetermined frequency band of the original image;

a noise extraction unit which performs processing of extracting a noise component in a predetermined frequency band from each of the one or more n reduced images in parallel;

a noise synthesis unit which synthesizes noise components extracted from the respective one or more n reduced images; and a subtraction unit which subtracts a synthesized noise component from the original image after noise reduction.

2. The image processing device according to claim 1, wherein frequency bands of the noise components extracted from the respective one or more n reduced images are not overlapped with a frequency band in which the noise component is reduced by the noise reduction unit and a frequency band of a noise component extracted from another reduced image.

3. The image processing device according to claim 2, wherein the noise reduction unit reduces the noise component of the original image by using a filter the same as a filter used for reducing the original image, and the noise extraction unit extracts the noise component of each of the one or more n reduced images by using a filter the same as a filter used for reducing each of the one or more n reduced images.

4. The image processing device according to claim 1, wherein the noise extraction unit is provided with n extraction units which individually extract the noise components of the respective one or more n reduced images, and the noise reduction unit and the n extraction units independently perform processing in parallel.

5. The image processing device according to claim 1, wherein the noise synthesis unit synthesizes the noise components by adding the noise components in order from a noise component of a smallest reduced image of one or more n reduced images while up-sampling at an enlargement factor opposite to a reduction factor when reducing the corresponding reduced image in a case of n≥2.

6. An image processing method comprising:

a reduced image generating step of reducing an original image in a stepwise manner to generate one or more n reduced images;

a noise reducing step of reducing a noise component in a predetermined frequency band of the original image;

a noise extracting step of performing processing of extracting a noise component in a predetermined frequency band from each of the one or more n reduced images in parallel;

a noise synthesizing step of synthesizing noise components extracted from the respective one or more n reduced images; and a subtracting step of subtracting a synthesized noise component from the original image after noise reduction.

* * * * *